Nov. 26, 1957 C. GROSS 2,814,282
TWO-STROKE ENGINE WITH CRANKCASE SCAVENGING
AND TUBULAR-SLIDE VALVE CONTROL
Filed Nov. 23, 1954 4 Sheets-Sheet 1

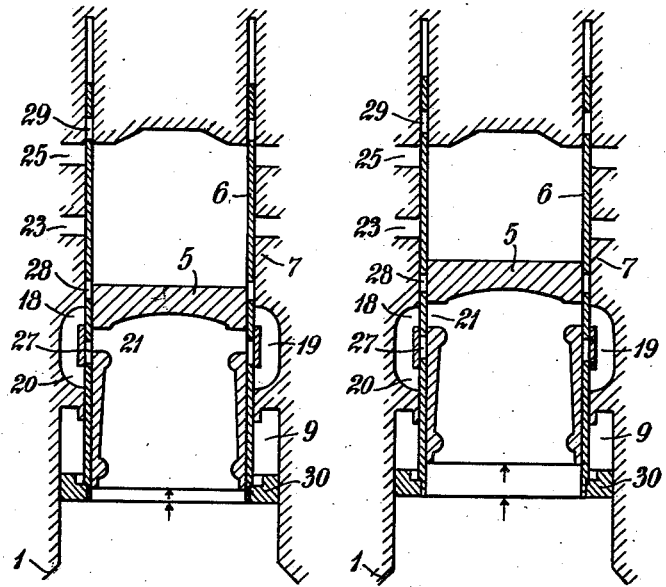

United States Patent Office 2,814,282
Patented Nov. 26, 1957

2,814,282

TWO-STROKE ENGINE WITH CRANKCASE SCAVENGING AND TUBULAR SLIDE VALVE CONTROL

Court Gross, Aal in Hallingdal, Norway, assignor to Primus Motor, Bestum, Norway, a company of Norway Application November 23, 1954, Serial No. 470,732

Claims priority, application Norway November 30, 1953

5 Claims. (Cl. 123—73)

For two-stroke engines with crankcase scavenging the use of tubular slide valve control affords considerable advantages, especially a rapid and efficient scavenging and opening and closing of the cylinder openings at exactly predetermined moments.

However, if it is desired to utilize these advantages of tubular slide controlled engines for obtaining a high operating frequency and hence a great power output relative to the dimensions of the engine, difficulties are encountered in eliminating the developed heat, and likewise the great inertia forces involved constitute a problem, apart from the fact that the scavenging naturally becomes more difficult with increasing operating frequency. It is true that the effect of the inertia forces can be compensated to a certain degree if the cylinder and the slide valve are arranged for movement in opposite directions, but on the other hand the friction losses will then increase. The present invention has for an object to overcome these difficulties.

The invention primarily consists in that the tubular slide is provided at the outside with an annular piston which operates in an enlarged cylinder bore, and which during the main part of the operating stroke of the engine contributes in compressing the air in the crankcase and hence causes increased aspiration of air during the return stroke. In this manner it is possible to increase the effective compression volume for the scavenging air relative to the cylinder volume and thereby to reduce the movable masses with respect to the quantity of scavenging air. In this connection it is convenient to make the tubular slide during the main part of the operating period move in the same direction as the piston, but with a smaller amplitude. Hereby the losses due to the friction of the slide against the cylinder and against the piston are reduced, and a reduction is also obtained in the inertia forces caused by the movement of the slide. Further it is possible in this way to minimize the dead space by making the enlarged cylinder bore open directly towards the crankcase.

The invention further provides that the crankcase has its air inlet through the motor piston, which for this purpose has openings at the periphery, which in the proximity of the top position communicate with inlet openings in the cylinder through slots in the tubular slide, and which discharge into the hollow space of the piston just below the piston head, so that by the aspiration there will occur a cooling of the piston with flowing air.

In this manner it becomes possible effectively to overcome the difficulties with respect to removal of heat from the piston.

In order to avoid inertia forces from excenter rods serving to control the tubular slide it is known to let rigid arms on the latter be guided in excentric grooves, but with known types of guiding means of this kind the serious wear occurring at high velocities might cause slackness in the excentric grooves involving the risk of turning the slide. To overcome this difficulty, in each excentric groove a ring or ring segment is placed, which is rockably mounted on the appurtenant slide arm.

Further the invention provides an arrangement which in a simple manner ensures automatic injection of fuel at the right moment, and which consists in that the opening of a needle valve for the fuel injection is caused by the action of the pressure in the crankcase while overcoming a counter-force.

Further features of the invention will appear from the following specification in connection with the accompanying drawings, which illustrate a convenient embodiment.

Figs. 4 to 9 show diagrammatic longitudinal sections with piston and slide in successive positions in the course of an operating period.

Figure 1:
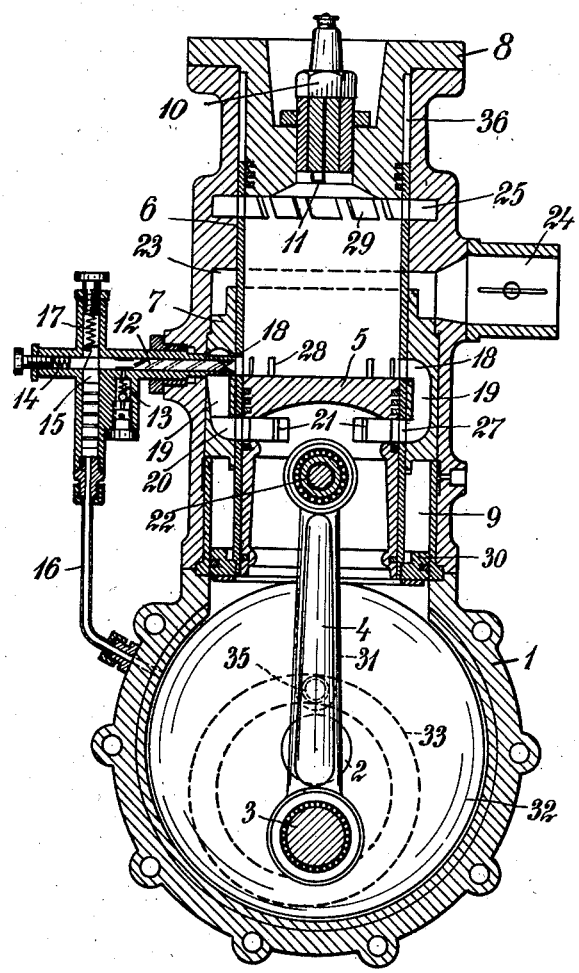
Figs. 1 and 2 show the engine in two sections taken axially with respect to the cylinder and transversely and longitudinally respectively with respect to the crank shaft.
Figure 2:
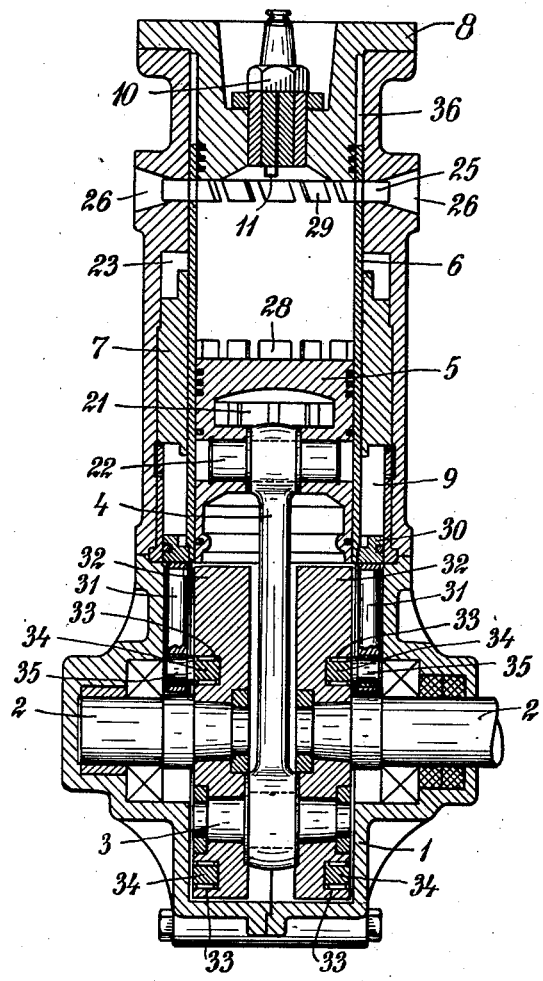

In the drawings 1 designates the crankcase, 2 the crank shaft, 3 the crank pin, 4 the connecting rod, 5 the motor piston, 6 the tubular slide valve and 7 the cylinder, which is closed at the top by the cylinder head 8 and has at the bottom a cylindric extension 9 directly joining the hollow space of the crankcase, which is also in direct connection with the hollow space of the piston 5. A plug 10 having an electric heating wire 11 for the ignition has been shown in the cylinder head 8, although in itself the invention is applicable for any type of two-stroke piston engines irrespectively of which kind of ignition is used, including for example diesel-, semidiesel- or explosion engines. For the injection of fuel a needle valve 12 has been shown in Fig. 1, which valve has its inlet from a ball valve 13 and is opened against the action of a spring 14 by the camming action from a slide 15, which in turn is actuated through a conduit 16 by the air pressure within the crankcase 1 against the action of a spring 17. The needle valve 12 is placed at the inlet for scavenging air to be blown into the cylinder. Here the cylinder is provided with recesses having openings 18 in the interior cylinder surface immediately above the top surface of the piston in the bottom position of the latter and connected by passages 19 to openings 20 in the cylinder wall immediately opposite openings 21 in the skirt portion of the piston immediately below the piston head on both sides of the gudgeon 22. Further there are formed in the cylinder an annular passage 23 which opens inwards towards the tubular slide substantially midway of the cylinder for supplying fresh air from an inlet 24, and an annular passage 25 which likewise opens inwards towards the slide, and which is connected to an exhaust outlet 26.

The tubular slide 6 is provided with slots 27, which in the bottom position of the piston connect the openings 20 in the cylinder with the openings 21 in the piston, slots 28, which in the same position of the piston communicate with the openings 18 in the cylinder, and slots 29, which likewise in the bottom position of the piston communicate with the annular passage 25.

Figure 3:
Fig. 3 is a sketch of a modified detail.

At the extremity facing the crankcase the slide 6 carries at the outside an annular piston 30 operating in the enlarged cylinder bore 9. By means of fixed arms 31 projecting downwardly from the slide the slide valve is controlled by excentrics on the crank shaft 2, a pair of concentric discs 32, which in the embodiment shown also form crank cheeks for the crank pin 3, having excentric grooves 33 therein, in which needle bearing rings 34 are inserted, which are rockably connected to either slide arm 31 by pivots 35. It is also conceived, if desired, instead of whole excentric rings to use ring segments 34' as indicated in Fig. 3.

The excentricity of the grooves 33 is considerably smaller than that of the crank pin 3, so that the movement of the tubular slide and hence of the annular piston 30 will be considerably shorter than the movement of the piston 5 and only corresponds to the distance from a position of the slots 28 substantially opposite the openings 18 to a position substantially opposite the annular passage 23.

For the control of the slide valve even other constructions than that shown may be conceived. For example, for each slide arm there may be provided one disc-shaped excentric co-operating with an excentric ring on either side in order to avoid bending stress in the slide arms.

Further it is possible instead of using fixed disc-shaped excentrics on the crank shaft as shown, to provide the excentric grooves in discs which are adjustable angularly about the shaft for regulating the closing and opening moments of the slide, for example by using mechanisms similar to those employed for the angular adjustment of propeller blades. In the embodiment shown it is assumed that there is provided a small constant angular displacement γ between excentric grooves and crank pin and hence a forward phase displacement between slide and piston of about 14°.

The extension 9 of the cylinder bore may in its upper end communicate with the atmosphere or, in order to avoid aspiration of dust particles, it may be connected to the corresponding space of an oppositely operating engine unit or of several phase-displaced engine units. The same applies to the cylindric space 36 provided for the slide in the cylinder head.

The operation will then be as follows:

In the bottom position of the piston (Fig. 1) the combustion space is in connection with the atmosphere through the openings 29, 25 at the top, so that the exhaust escapes. At the same time the crankcase communicates through the openings 21, 27, 20 with the passages 19, which in turn are in connection with the combustion space in front of the piston through the openings 18, 28, so that compressed air from the interior space of crankcase and piston has access to the combustion space and scavenges the same so as to clean it for combustion products. Further, through the last mentioned openings fuel is injected through the needle valve 12, which is kept open by the pressure within the crank case.

Consequent to the phase displacement referred to above, the slide 6 is already moving upwards in the lower dead point position of the piston and will therefore move quicker than the piston even during the first part of the return stroke of the latter. Consequently (as shown in Fig. 4) the slide will close the cylinder openings 20, 18 and 25 before the piston closes the injection openings 28 of the slide. Thus, it is entirely under the control of the designer to place the slide openings 28 and 29 so that the injection openings 18 are closed slightly before or slightly after the exhaust openings 25 according to what is required to obtain optimum scavenging and injection conditions. At the moment when the openings 18 and 20 are closed the pressure in the crankcase will practically have come in balance with the atmospheric pressure so that the needle valve 12 will have closed and the piston 5 will during its further movement subject the crankcase to vacuum, and this effect is enforced by the fact that also the annular piston 30 is moving upwards at the same time. Further, when the openings 25 are closed, the piston 5 starts compressing the injected mixture of air and fuel in the usual manner.

When a certain part of the return stroke has been performed, the velocity of the piston will exceed that of the slide due to the greater excentricity of the crank pin, and the piston 5 will close the injection opening 28 of the slide as shown in Fig. 5.

During the further upward movement of piston and slide the opening 28 will, when the slide approaches its uppermost position, start communicating with both the fresh-air opening 23 of the cylinder and the openings 21 of the piston as shown in Fig. 6, whereby fresh air is aspired into the piston and hence into the crankcase. Hereby the fresh air will exert a strong scavenging effect on the piston 5 and cool the same efficiently.

This aspiration continues until the slide has passed the top position. But on reversing, due to its downward movement with respect to the piston which is still moving upwards, the slide will close the piston openings 21 just before the piston attains the top position (Fig. 7), whereby the scavenging air in the space under the piston head, which in the meantime has attained atmospheric pressure, will be shut off from the atmosphere practically at maximum volume. In or close to the top position the compressed mixture of air and fuel above the piston is ignited in the usual manner. However, during the subsequent expansion stroke the slide 6 will again start moving quicker than the piston due to the phase displacement and will therefore close the cylinder openings 28 before the openings 21 of the piston start communicating with the openings 23 of the slide, so that the enclosed air volume will not again be connected to the atmosphere during the expansion stroke.

Figure 8:
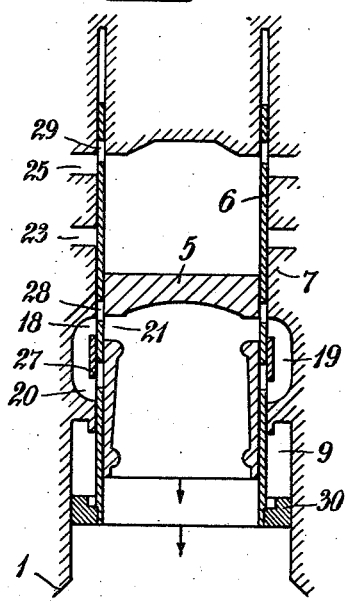

Therefore, during the continued expansion stroke an increasing compression of the enclosed air takes place both by means of the piston 5 and by means of the annular piston 30, and the piston 5 will again attain its highest velocity while the slide is still moving downwards, so that favorable conditions are obtained with respect to friction. As the slide approaches the bottom position as shown in Fig. 8, the slots 29 thereof will then start uncovering the exhaust openings 25 of the cylinder, whereby the combustion products begin to escape so that the combustion space adopts atmospheric pressure. Fig. 8 also shows that for a moment a connection may exist from the enclosed air within the piston through the openings 21, 28, 18 to the passages 19, which may be convenient with a view to an initial compression of the air in these passages and hence also to a favorable opening moment for the valve 12.

Figure 9:
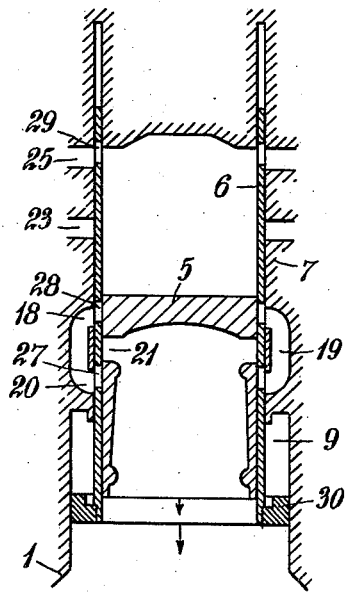

However, during the further movement towards the bottom position the piston will still keep the openings 27 and 28 of the slide closed as shown in Fig. 9, so that the pressure within the combustion space has time to drop practically to atmospheric pressure before the scavenging air is admitted, which admission starts substantially in the bottom position of the slide, in which the latter is moving upwards while the piston is still moving towards the bottom position. As before, the compressed scavenging air will then be pressed into the cylinder through the passages 19 and clean the combustion space, and because of the difference in pressure which occurs, the needle valve 12 will open and admit fuel. If a venturi-effect is desired in connection with the injection, this can easily be arranged by providing a connection from the crankcase to the injection valve 12.

I claim:

1. A two stroke combustion engine comprising a cylinder, a crank-case and a crank shaft rotatable therein, a piston operatively connected to said crank shaft for driving the same and reciprocating within said cylinder for confining a combustion space therein and for alternately compressing air within said crank-case and combustible medium within said space, a tubular slide valve encircling said piston and operatively connected to said crank shaft for reciprocating within said cylinder, said piston having air passages in its periphery in the proximity of its front face and communicating through the interior of the piston with the interior of the crank-case, and said cylinder having an air intake passage, an exhaust passage and air injection passages therein, and said slide valve having openings therein so located that in the proximity of the top position of the piston the said air passages therein communicate with said air intake passage, and that in the proximity of the bottom position of the piston said air passages communicate through said air injection passages with the combustion space and the latter communicates with said exhaust passage.

2. A two-stroke combustion engine as claimed in claim 1, in which those openings in the slide which in the proximity of the top position of the piston connect said air intake passage of the cylinder to said air passages of the piston, connect said air injection passages to the combustion space in the proximity of the bottom position of the piston.

3. A two-stroke combustion engine as claimed in claim 1, in which those openings in the slide valve which in the proximity of the bottom position of the piston connect the combustion space to the exhaust passage and to the injection passages, respectively, are located so that the slide valve will close these passages at slightly different moments.

4. A two-stroke combustion engine comprising a cylinder, a crank-case and a crank shaft rotatable therein, a piston operatively connected to said crank shaft for driving the same and reciprocating within said cylinder for confining a combustion space therein and for alternately compressing air within said crank-case and combustible medium within said space, a tubular slide valve encircling said piston and operatively connected to said crank shaft for reciprocating within said cylinder with a slight lead with respect to the piston, said piston having air passages in its periphery in the proximity of its front face and communicating through the interior of the piston with the interior of the crank-case, and said cylinder having an air intake passage, an exhaust passage and air injection passages therein, and said slide valve having openings therein so located that in the proximity of the bottom position of the piston said air passages communicate through said air injection passages with the combustion space and the latter communicates with said exhaust passage, and said slide valve having air aspiration openings so located that shortly before the piston attains the top position these openings connect said air intake passage to said air passage of the piston, but due to the said lead the slide thereafter closes the said air passages of the piston and keeps these closed until the slide valve has closed the intake passage during the operation stroke.

5. A two-stroke combustion engine as claimed in claim 4, in which the said lead is correlated so with respect to the relative positions of the openings in the slide valve and the injection and exhaust passages of the cylinder, that these passages are uncovered by the slide valve shortly before the piston uncovers those openings of the slide valve which connect the injection passages to the combustion space, and are closed by the slide valve shortly before the piston closes the last-mentioned openings of the slide valve.

References Cited in the file of this patent
UNITED STATES PATENTS

| | | |
|---|---|---|
| 823,450 | Stewart | June 12, 1906 |
| 993,939 | Adams | May 30, 1911 |
| 1,022,803 | Troutt | Apr. 9, 1912 |
| 1,308,560 | Stokes | July 1, 1919 |
| 1,870,139 | Pierotti | Aug. 2, 1932 |
| 2,242,871 | Raab et al. | May 20, 1941 |

FOREIGN PATENTS

| | | |
|---|---|---|
| 420,602 | Germany | Oct. 28, 1925 |
| 574,926 | France | Apr. 9, 1924 |